Patented Nov. 20, 1923.

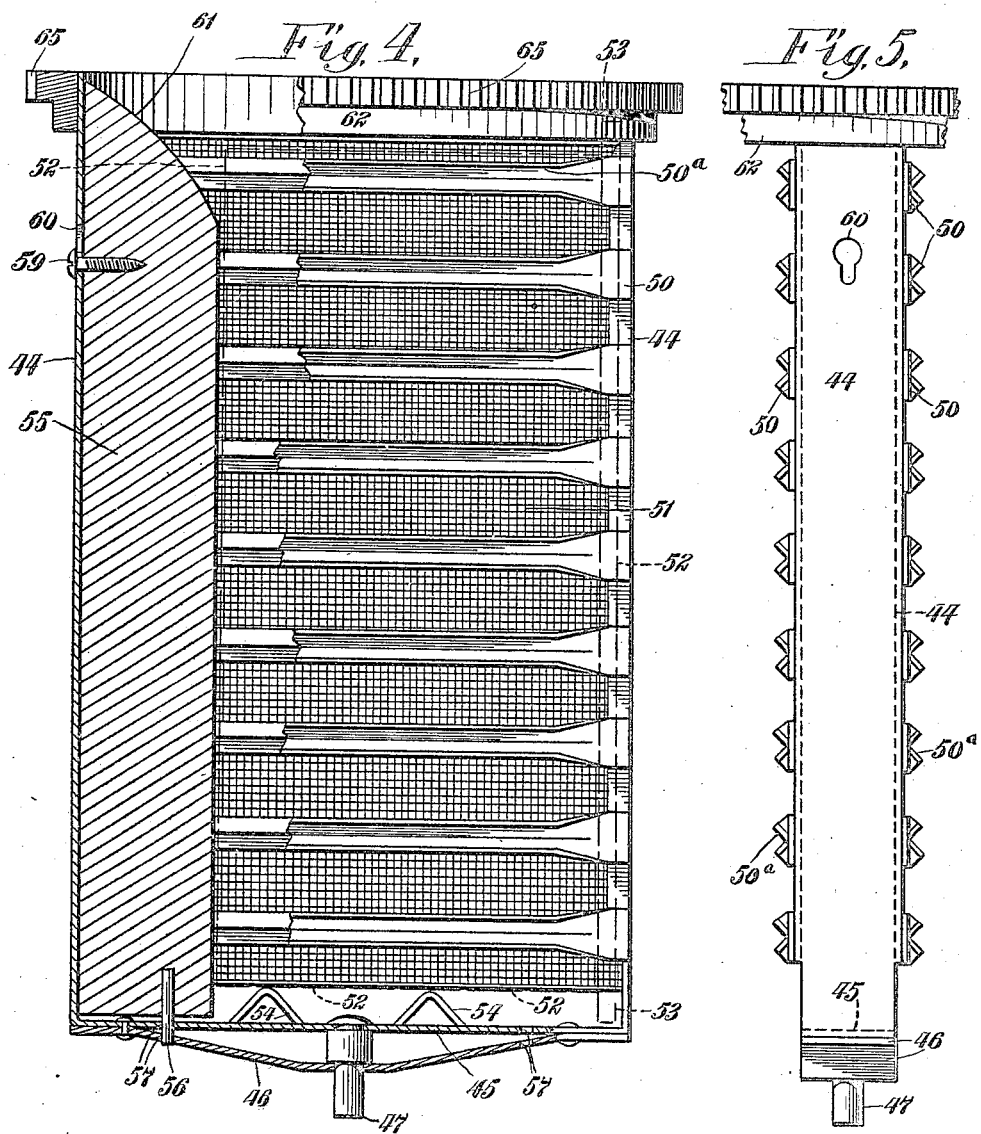

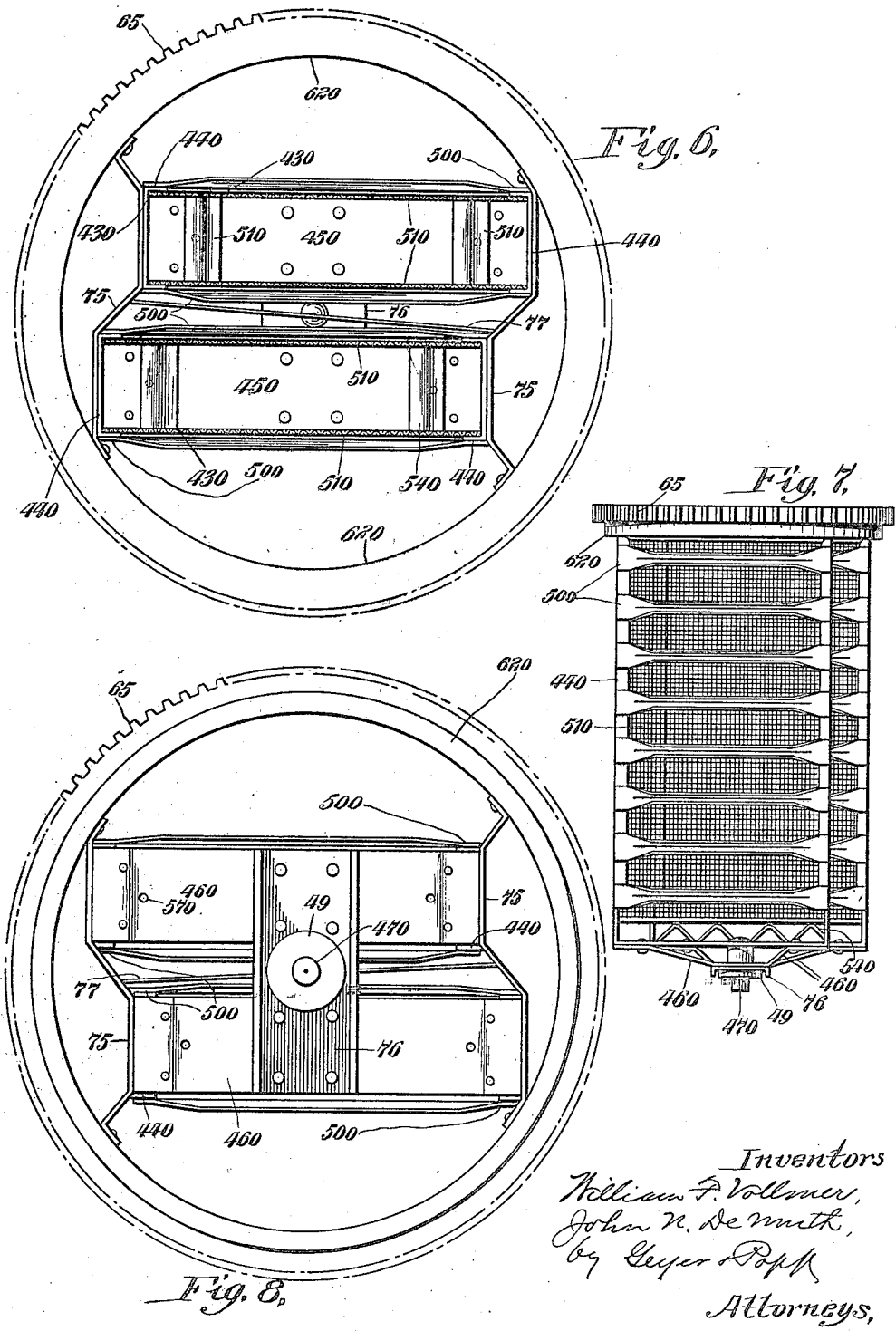

1,474,865

UNITED STATES PATENT OFFICE.

WILLIAM F. VOLLMER, OF AKRON, AND JOHN N. DE MUTH, OF PEMBROKE, NEW YORK.

HONEY EXTRACTOR.

Application filed November 8, 1920. Serial No. 422,494.

*To all whom it may concern:*

Be it known that we, WILLIAM F. VOLLMER, a citizen of the United States, residing at Akron, in the county of Erie and State of New York, and JOHN N. DE MUTH, a citizen of the United States, residing at Pembroke, in the county of Genesee and State of New York, have invented new and useful Improvements in Honey Extractors, of which the following is a specification.

This invention relates to a machine for expelling the honey from the cells of honey combs by centrifugal force.

One of the objects of the invention is to permit of emptying the honey-containing cells on both sides of each honey comb while the main frame of the machine is being rotated continuously in one direction and at a high rate of speed.

A further object is to provide an improved basket or holder for the honey combs which has the requisite strength and stiffness to prevent its sagging or bending out of shape in the course of time.

Another object is to improve the construction of the machine with a view of materially increasing its extracting capacity.

The invention has the further object to improve this class of machines in various other respects, as will hereinafter appear.

Figure 1:
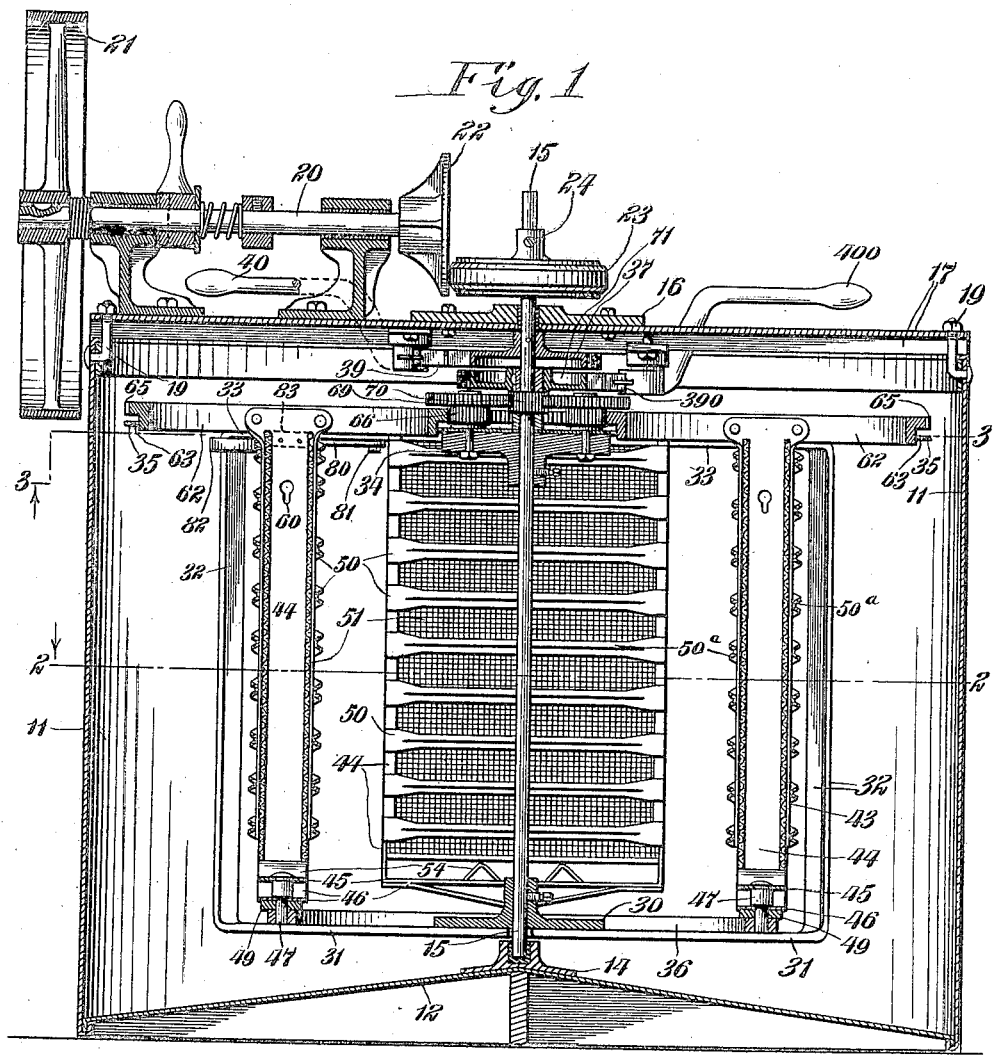
Figure 2:
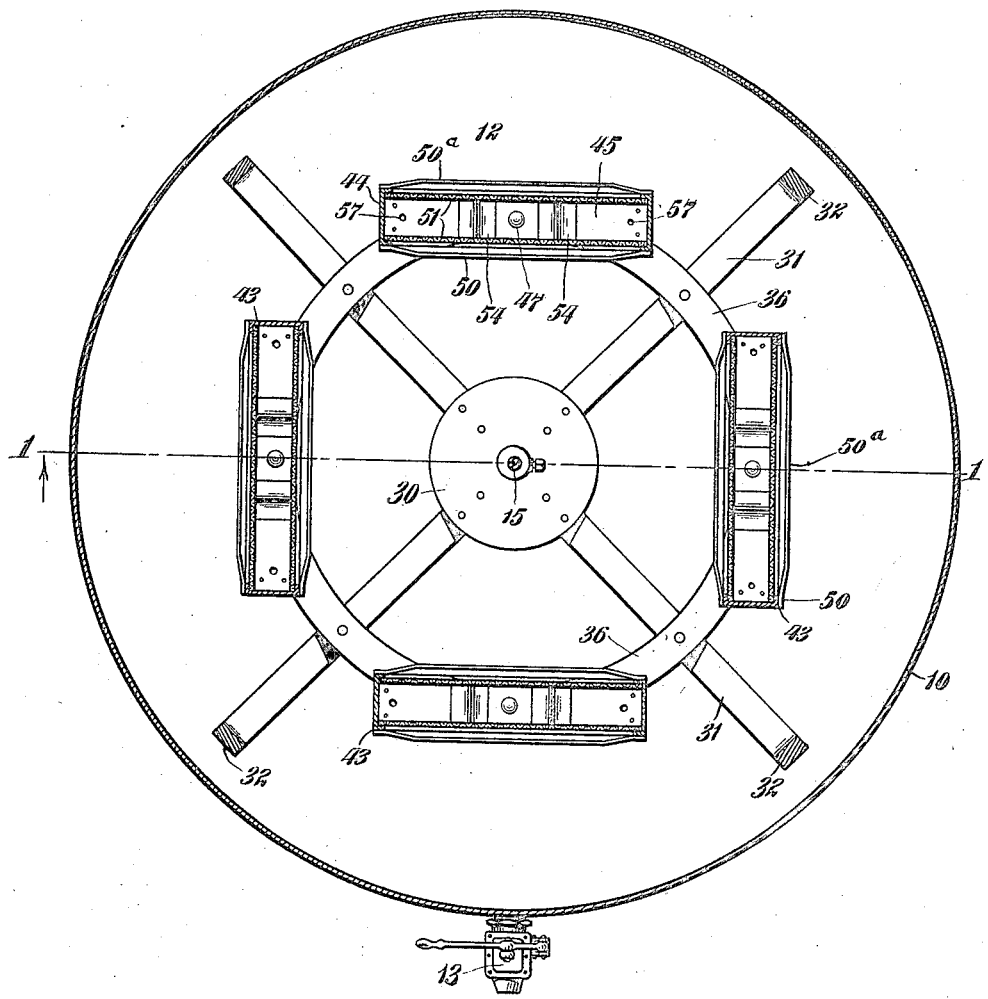
Figure 3:
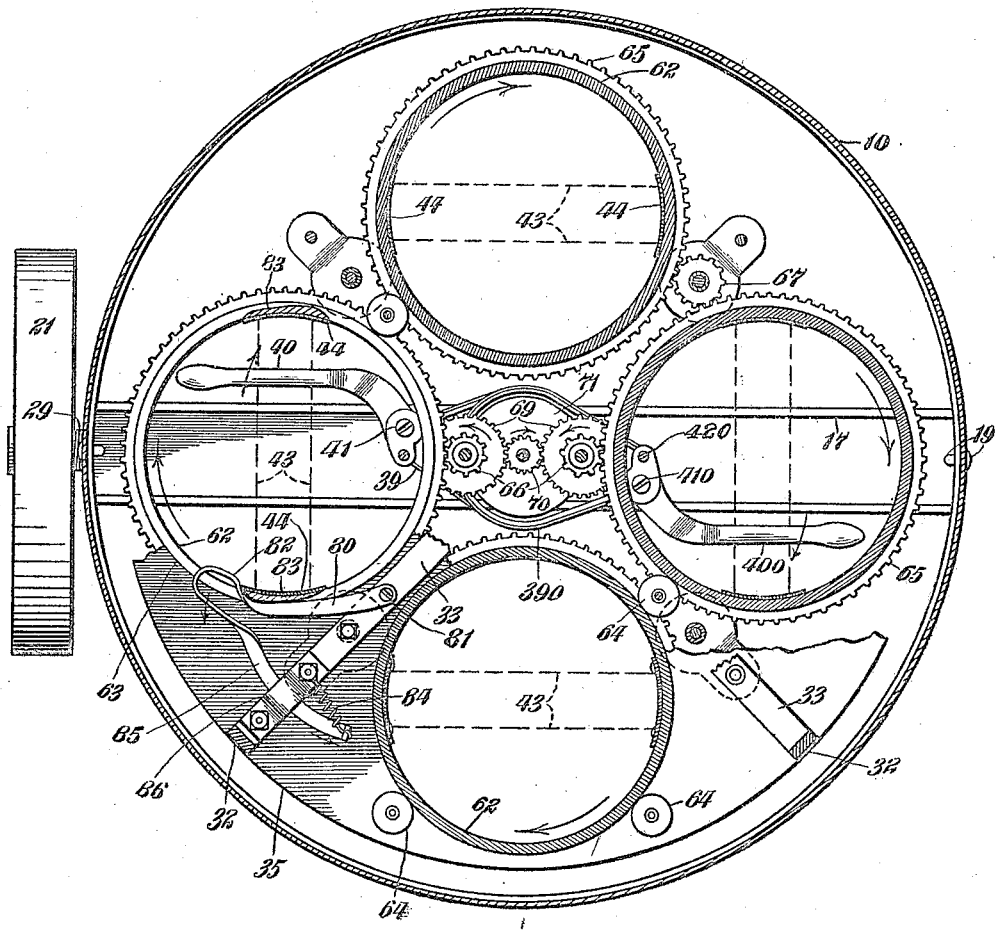

In the accompanying drawings:

Figure 1 is a vertical longitudinal section of the machine on line 1—1, Fig. 2. Figure 2 is a horizontal section on line 2—2, Fig. 1. Figure 3 is a similar section on line 3—3, Fig. 1; looking upwardly. Figure 4 is an enlarged side elevation, with one side broken away, of one form of honeycomb basket adapted to carry a single comb. Figure 5 is an enlarged end elevation of the same with portions of the supporting ring broken away. Figure 6 is an enlarged top plan of a modified form of supporting basket in which two honeycombs are carried in each basket. Figure 7 is a side elevation of the same. Figure 8 is an enlarged bottom plan thereof.

Similar characters of reference indicate corresponding parts throughout the several views.

In its general organization, this honey extractor comprises a power driven, rotatable frame arranged in a honey-receiving tank or vessel 11 and carrying a number of supporting baskets for the honey-combs which may be simultaneously rotated relatively to said main rotary frame to reverse the honey combs from time to time in order to subject both sides thereof to the centrifugal separating action of the machine and fully extract the honey from the combs. The last-mentioned movement of the baskets is preferably effected by frictional driving means and at a comparatively slow speed, so that the high speed of rotation of said rotary frame does not have to be lessened while this independent reversing movement of the supporting baskets is being effected.

In the preferred form shown in the drawings, the honey-receiving tank 11 is cylindrical and provided with a conical bottom 12. The honey collected in said tank may be periodically discharged through a valved spout or outlet pipe 13 located near its bottom. Secured to the central upper face of the conical bottom 12 is a step bearing 14 in which is journaled the lower end of an upright shaft 15. The upper end of said shaft is journaled in an upper bearing 16, mounted centrally on a bridgepiece 17 extending across the top of the tank and secured thereto by clamping bolts 19. The said upright shaft may be power driven in any suitable way, the means shown in the drawings being satisfactory and consisting of a horizontal drive-shaft 20 journaled on the bridge-piece 17 and carrying at its outer end a belt-pulley 21 which may be connected to any suitable source of power. The inner end of said drive shaft is provided with a friction disk or wheel 22 which is adapted to frictionally engage with a leather faced, friction-wheel 23 secured to the upper end of the upright shaft 15. To obtain different rotative speeds of the latter, it is only necessary to loosen the set screw 24 of the friction wheel 23 and then shift it toward or from the axis of rotation of said friction disk 22, after which the set screw 24 is again tightened. Any suitable means may be employed for shifting the friction disk 22 into and out of gear with the friction wheel 23.

The shaft 15 has secured to its lower end a head or disk 30 to which is fastened a spider or a set of radial arms 31, as shown in Figs. 1 and 2. Secured to the upper portion of said shaft is a similar disk 34 carrying an upper spider or set of radial arms 33, and connecting the outer ends of the upper and lower spider-arms are a number of upright equidistant frame-bars 32. Secured to the upper faces of said upper flange 34 and the upper radial arms 33, is a horizontal baffle disk or plate 35 whose periphery is disposed but a short distance from the wall of the tank 11. As shown in Figs. 1 and 2, the lower radial arms 31 are additionally connected together and mutually braced by a horizontal ring 36 arranged concentrically to the upright shaft 15. This ring together with the upper and lower spiders 33 and 31, the upright frame-bars 32 and the baffle disk 35, constitute a skeleton frame which is adapted to rotate with the shaft 15 and carry the honey-comb baskets hereinafter described. For the purpose of stopping the rotation of said frame, when desired, a brake of any suitable construction may be employed, that shown comprising an ordinary brake drum 37 secured to the upper portion of the upright shaft 15 and a brake band 39 surrounding said drum and adapted to be tightened thereon by a brake lever 40 fulcrumed at 41 on the bridge piece 17.

Suitably mounted in said main rotary frame and adapted to be reversed or rotated relatively thereto, whenever desired, are a number of honey-comb baskets 43 each of which comprises a pair of vertical side plates 44 disposed at either side of the basket, a horizontal tension bar 45 connecting the lower ends of said side plates, and an approximately V-shaped compresion bar 46 secured to opposite ends of said tension bar 45. These tension and compression bars form a truss which extends across the bottom of the basket and gives it the necessary strength and stiffness to resist sagging or distortion under the weight of the contained honey-comb or combs.

Each basket is provided at its lower end with an axial pivot or stud 47, the upper portion whereof is received between the said tension bar 45 and the said compression bar 46, while its reduced lower portion extends below the compression bar. Each of these pivots is journaled at its lower end in a bearing in the carrying ring 36, the downward pressure of the basket being preferably sustained by an anti-friction thrust washer 49 encircling the pivot between the carrying ring 36 and the compression bar 46.

A plurality of spaced horizontal parallel retaining bars 50 extend across the front and rear sides of each basket, the opposite ends thereof being brazed or otherwise secured to opposite edges of the side plates 44 of the basket. The central or intermediate portion of each retaining bar is preferably stiffened by one or more integral longitudinal ribs 50ª of V-shaped cross section, as best shown in Figs. 4 and 5. Resting against the inside faces of the said retaining bars and restrained against outward displacement thereby, are a pair of vertical retainment screens 51 which bear against opposite sides of the honey-combs in a manner common to such machines.

The honey-combs, as they come from the hive, are provided with a wooden frame such as indicated by dotted lines 52 in Fig. 4, and these frames invariably have one side wall extending somewhat beyond the adjacent ends of the frame, as indicated at 53. For the purpose of supporting the honey-comb holding frame 52 in a level and upright position, notwithstanding the projecting wall 53, a number of raised seats or risers 54 are secured to the upper face of the tension bar 45 of the basket, these risers being high enough to elevate said well clear of the floor of the basket.

In some cases, the honey-comb carrying frames are smaller than the size for which the machine is primarily designed. In such a case, to prevent undue lateral displacement of said frame, a vertically disposed removable filler block 55, Fig. 4, may be employed which occupies the portion of the supporting basket not occupied by the honey-comb. The lower end of this filler block is provided with a downwardly-projecting pin 56 which is adapted to engage with either of two pairs of vertical holes 57 formed in both the compression bar 45 and tension bar 46 of each supporting basket on opposite sides of its axis. The upper end of the filler block is provided with a laterally and outwardly projecting screw stud 59 which is adapted to slip down into and firmly engage with a key-hole slot 60 which is formed centrally in the upper end of each of the upright strips 44 of each carrying basket. It is desirable to round or cut off obliquely the upper end 61 of the filler block to facilitate the filling and emptying of the supporting basket. It is obvious that such a filler block may be used at either or both sides of each of the carrying baskets, and it is for this reason that the holes 57 are duplicated.

The upper ends of the vertical side plates 44 of each basket are secured to the inner face of a rotary horizontal supporting ring or gear rim 62 which is received within an opening 63 in the baffle plate 35 and is guided by a number of rollers 64 mounted on the baffle-plate—as best shown in Fig. 3. Each of said supporting rings is provided with an upper peripheral flange having gear teeth 65, which, in the case of one pair of supporting rings, mesh with and are driven by a pair of drive gears 66 suitably journaled on the rotary frame of the machine, in this case on the upper head or flange 34. The other pair of supporting rings are driven synchronously with and by the aforementioned pair of supporting rings, by a pair of transfer spur gears 67 which are journaled on the baffle plate 35 and mesh with the gear teeth of the adjacent supporting rings 62, so as to transfer the power, in each case, from the pair of supporting rings which is driven positively by the drive gears 66 to the other pair of supporting rings. Each of said drive gears 66 is coaxially connected with an intermediate spur gear 69 whose diameter is preferably somewhat greater than that of the gears 66. The two intermediate gears 69 mesh with opposite sides of a spur or sun-gear 70 which is loosely journaled on the upright shaft 15. The hub of said loose gear extends upwardly and is secured to the hub of a manually-operated reversing or brake drum 71 similar to the brake-drum 37. 400 indicates a horizontally-swinging brake handle or lever pivoted to the bridge piece 17 at 410 and 390 a flexible brake band embracing said drum and secured to pivots 420 on said lever, whereby movement of the lever in the direction indicated by the arrow in Fig. 3, tightens said band 390 on the reversing drum, enabling the operator to hold said drum and said loose gear 70 from turning. When this is done, while the rotary basket carrying frame is in motion, the planetary gears 69 revolve about said stationary or sun-gear 70 with said frame, and are rotated about their own axis. This motion is transmitted to the baskets through the pinions 66 and gear-rims 62, causing the baskets to turn relatively to said rotary main frame until the brake lever 400 is released, whereupon the sun gear 70 is again released and the gear trains 69, 66 and 62 revolve idly with said main frame without affecting the baskets.

To obtain the best extracting results, it is desirable to maintain the honey-comb baskets in a position substantially tangential to their orbit or circular path of revolution about the driving shaft 15, because in that position the centrifugal force, caused by the rotation of the frame, acts in a direction parallel to the honey-comb cells. This position of the carrying baskets is shown in Figs. 2 and 3. A yielding stop or spring-catch 80 (Fig. 3) is provided to prevent overtravel of the baskets beyond that tangential position. This stop means may be of any appropriate construction. That shown in the drawings consists of a horizontally-swinging arm 80 pivoted to one of the upper radial arms 33 at 81 and arranged adjacent to one of the baskets. This arm terminates in a stop-shoulder or head 82 adapted to engage a corresponding shoulder 83 formed on or secured to one of the side plates 44 of said basket, Figs. 1 and 3. The yielding pressure of said head 82 against the stop shoulder 83 is provided by a tension spring 84 secured at one end to the adjacent radial arm 33 of the rotary frame, while its other end is secured to the free downturned end of an arm 85 guided on the rotary frame by a clip 86 and connected to the head 82 of the stop arm 80. Inasmuch as all of the supporting baskets are geared together, only one resilient stop 80 and one pair of stop shoulders 83 are required. As shown in Fig. 3, the basket stop-shoulders 83, are located at diametrically opposite sides of the basket and the stop 80 therefore comes into operation after every half revolution of the baskets relatively to the rotary frame.

The general operation of the machine is as follows:

The honey-combs being placed in the baskets and power being transmitted to the upright shaft 15, the frame carrying the baskets is rapidly rotated, causing the honey to be expelled from the combs by the resulting centrifugal force and thrown into the tank 11, from which it is discharged from time to time through the valved spout 13. To reverse the comb-baskets the operator holds the sun gear 70 stationary on the shaft 15 by means of the brake lever 400, brake band 390 and drum 71, causing the baskets to be rotated on their own axes until the operator releases said brake band. When during such rotation of the baskets, one of the stop shoulders 83 arrives opposite the stop-arm 80, these parts interlock frictionally and arrest the further rotary movement of the baskets, as hereinbefore described. These stop devices do not positively lock the baskets, but only serve as positioning devices for the baskets when they reach the desired tangential position already referred to and shown in Figs. 2 and 3, thus requiring less skill and care on the part of the operator to stop the baskets in that position in reversing them. When the baskets are to be again rotated 180 degrees, the resilient stop arm 80 is merely thrust back out of the way of the basket shoulders 83 by the power which is imparted to the supporting rings 62 from the loose gear 70.

When small sized honey-combs are to be inserted into the supporting baskets, it is preferable to employ one or more of the filler blocks 55 hereinbefore described.

Figs. 6, 7 and 8 show a modification in which double comb-carrying baskets are employed instead of the single-comb baskets shown in the first-described construction. In this case, each of the supporting rings 620 carries two of such supporting baskets which are substantially parallel to each other and secured together at their upper ends and also secured to said ring by a pair of bent connecting plates or straps 75.

Each basket 430 is constructed substantially like the baskets 43 previously described, being made up of a pair of upright side plates 440, a horizontal compression bar 450 joining the lower ends of said side plates, a tension bar 460 secured to the opposite ends of said compression bar, a plurality of horizontal retaining bars 500 arranged on either side of the basket and secured at opposite ends to said side plates, a pair of vertical retaining screens 510 arranged against the inner faces of said retaining bars, and a pair of risers 540 secured to the upper face of the compression bar 450 and adapted to support the honey-comb holders that are placed in the supporting basket. The lower compression bars 460 are preferably tied together centrally by a channel-iron or bridge-piece 76 from whose central part depends a pivot-stud 470 which is journaled in the carrying ring 36 and acts as an axis of rotation for this double basket.

Standing obliquely between the twin supporting baskets 430 and secured at its opposite vertical edges to the connecting plates 75 is a honey-deflecting plate 77. By this arrangement, the honey is discharged from the inner sides of the opposing honey-combs against this oblique deflecting plate and thence flows into the honey receiving tank 11, this action resulting even though the honey-comb baskets be disposed tangentially to their orbits. This result would not be obtained if the honey-deflecting plates 77 were not arranged obliquely, because in such a case the honey would accumulate on the inner face of said plate and the centrifugal action of the rotary frame would in nowise tend to throw the honey therefrom.

With both of the single and double forms of supporting baskets, the honey-combs are evenly and properly supported and the bottom part of the baskets is properly braced or trussed, so as to resist sagging or distortion after continued use and abuse for a long period of time. When it is desired to remove the mechanism of the extractor for the purposes of cleaning or repair, it is necessary to remove the nuts of the bolts 19 and lift all the working parts as a unit out of the tank.

The rotation of the basket carrying frame not only centrifugally removes the honey from the combs but also tends to throw out the entrapped air as well, in the manner of a centrifugal air pump. This objectionable action is prevented by the baffle plate 35 which stops said currents.

We claim as our invention:

1. A honey extractor comprising a tank, a frame rotatably mounted therein, a supporting basket rotatably mounted in said frame, means for rotating said supporting basket relatively to said frame, frictional stop means mounted on said frame for limiting the rotation of said basket relatively to said frame, and a spring for holding said stop-means in engagement with said basket.

2. A honey extractor comprising a tank, a frame rotatably mounted therein, a supporting basket rotatably mounted in said frame, means for rotating said supporting basket relatively to said frame, and stop-means for said basket including an arm pivoted to said rotary frame and arranged to engage the basket, a guide arm connected with said pivoted arm, and a spring connecting said guide arm with said rotary frame.

3. A honey extractor comprising a tank, a frame rotatably mounted within said tank, a supporting basket rotatably arranged in said frame, and a stop for limiting the rotary movement of said basket relatively to said frame, said basket being provided at opposite sides thereof with stop devices co-operating with said stop to stop the rotary movement of the basket twice during every complete turn thereof.

4. A honey extractor comprising a tank, an upright shaft journaled therein, a frame mounted on said upright shaft, a plurality of supporting baskets rotatably mounted in said frame, means for simultaneously rotating said baskets relatively to the frame, and stop means for all of said baskets co-operating with only one of the same.

5. A honey extractor comprising a tank, a rotary frame arranged in said tank, means for driving said frame, a plurality of honey-comb baskets revoluble with said frame and rotatable on their own axes independently of said frame, gearing for rotating a pair of opposing baskets, and gearing for transmitting rotary motion from the last-named baskets to the remaining baskets.

6. In a honey-extractor, a honey-comb basket having a pair of vertical side members, an upper horizontal tension bar connecting the lower ends of said side members, a lower compression bar secured to opposite ends of said tension bar, and a vertical pivot having its upper portion arranged between said tension and compression bars and having its lower portion extended below said compression bar.

7. A honey-extractor, comprising a tank, a rotary frame arranged therein, a baffle plate arranged in the tank near its upper end and having openings, rotary gear rings guided in said openings, and honey-comb baskets attached to said rings to turn therewith.

8. In a honey-extractor, a honey-comb basket having a keyhole slot in its wall, and a filling block removably arranged in the basket and provided with a headed-pin engaging said slot.

9. In a honey-extractor, a honey-comb basket having an opening in its bottom and a keyhole slot in its wall, and a filling block removably arranged in the basket and provided at its lower end with a stud engaging said bottom opening and near its upper end with a headed pin engaging said keyhole slot.

10. A honey-extractor, comprising a frame, a supporting member rotatably arranged in said frame, a plurality of honeycomb baskets secured in substantially parallel relation to said supporting member on opposite sides of its axis, and a honey-deflecting plate arranged between said baskets and disposed obliquely thereto.

WILLIAM F. VOLLMER.
JOHN N. DE MUTH.